(12) United States Patent
Dotz (10) Patent No.: US 12,401,241 B2
(45) Date of Patent: Aug. 26, 2025

(54) ROTOR MODULE FOR A ROTOR OF A ROTARY ELECTRIC MACHINE

(71) Applicant: Valeo eAutomotive Germany GmbH, Erlangen (DE)

(72) Inventor: Boris Dotz, Bad Neustadt a.d.Saale (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 288 days.

(21) Appl. No.: 18/062,749

(22) Filed: Dec. 7, 2022

(65) Prior Publication Data

US 2023/0179041 A1    Jun. 8, 2023

(30) Foreign Application Priority Data

Dec. 8, 2021 (DE) ...................... 10 2021 213 932.9

(51) Int. Cl.
    *H02K 1/27* (2022.01)
    *H02K 1/276* (2022.01)
    *H02K 1/28* (2006.01)

(52) U.S. Cl.
    CPC .............. *H02K 1/276* (2013.01); *H02K 1/28* (2013.01)

(58) Field of Classification Search
    CPC ...... H02K 1/276; H02K 1/28; H02K 2201/06; H02K 29/03; H02K 2213/03; H02K 1/2766
    See application file for complete search history.

(56) References Cited

U.S. PATENT DOCUMENTS

| | | | |
|---|---|---|---|
| 2002/0047432 A1 | 4/2002 | Miyashita et al. | |
| 2010/0117475 A1* | 5/2010 | Leonardi ................. | B60L 50/61 310/156.47 |

(Continued)

FOREIGN PATENT DOCUMENTS

| | | |
|---|---|---|
| CN | 113224878 A | 8/2021 |
| CN | 114362399 A | 4/2022 |

(Continued)

OTHER PUBLICATIONS

Search Report issued in corresponding German Application No. 10 2021 213 932.9, dated Sep. 9, 2022 (8 pages).

(Continued)

*Primary Examiner* — Thomas Truong
(74) *Attorney, Agent, or Firm* — Osha Bergman Watanabe & Burton LLP (57) ABSTRACT

A rotor module for a rotor of a rotary electric machine with an axis of rotation having a stator and a stator core including radially oriented stator teeth is disclosed. The rotor module has a rotor module core and permanent magnets defining a number of magnetic pole pairs, including a first pole and a second pole. The first and second poles of each magnetic pole pair are adjacent. The permanent magnets define first magnet arrangements defining each first pole and second magnet arrangements defining each second pole. A first angle between the first and second pole of each pair is equal to 360° divided by two times the number of magnetic pole pairs. A second angle between a second pole of a first pole pair and a first pole of a second pole pair is the sum of the first angle and a first shift angle.

15 Claims, 8 Drawing Sheets

(56) References Cited

U.S. PATENT DOCUMENTS

| | | | |
|---|---|---|---|
| 2012/0126637 A1* | 5/2012 | Ankeney | H02K 15/03 310/43 |
| 2018/0175681 A1* | 6/2018 | Tang | H02K 1/2706 |
| 2019/0207446 A1* | 7/2019 | Swales | H02K 16/02 |
| 2020/0136446 A1 | 4/2020 | Saito et al. | |
| 2021/0226490 A1* | 7/2021 | Marvin | H02K 1/276 |

FOREIGN PATENT DOCUMENTS

| | | |
|---|---|---|
| DE | 10348401 A1 | 5/2004 |
| DE | 102008042976 A1 | 4/2010 |
| DE | 102018127437 A1 | 5/2019 |
| DE | 102020121864 A1 | 2/2022 |
| EP | 2131475 A2 | 12/2009 |
| FR | 3083022 A1 | 12/2019 |
| JP | H05-137304 A | 6/1993 |
| WO | 2020/002827 A1 | 1/2020 |

OTHER PUBLICATIONS

Extended European Search Report issued in European Patent Application No. 22205888.5 mailed on May 10, 2023 (10 pages).

* cited by examiner

ROTOR MODULE FOR A ROTOR OF A ROTARY ELECTRIC MACHINE

The present invention relates to a rotor module for a rotor of a rotary electric machine which reduces the torque ripple. The present invention also relates to a rotor comprising such a rotor module and a rotary electric machine comprising such a rotor.

In a known manner, rotary electric machines with an axis of rotation comprise a rotor comprising a plurality of rotor modules. Each rotor modules comprises:
- a rotor module core,
- a plurality of permanent magnets defining a number of magnetic pole pairs comprising a first pole and a second pole, the first pole and the second pole of each magnetic pole pair being adjacent,
- the first poles being North poles and the second poles being South poles or the first poles being South poles and the second poles being North poles,
- the plurality of permanent magnets comprising first magnet arrangements defining each first pole and second magnet arrangements defining each second pole, the first magnet arrangements and the second magnet arrangements being distinct,
- a first angle between the first pole and the second pole of each pairs is equal to 360° divided by two times the number of magnetic pole pairs.

Each rotor module is angularly shifted with respect to the adjacent rotor modules. The rotor modules are skewed in the axial direction such that the circumferential positions of the poles vary along an axial length of the rotor. Such an angular shift allows a reduction of the torque ripple of the rotary electric machine. However, such an arrangement of rotor modules requires the use of different types of rotor modules especially to allow a mechanical connection between the rotor modules and a shaft of the rotary electric machine and between the plurality of rotor modules. These different types of rotor modules require different manufacturing tools. The manufacturing is complex and the cost of the rotary electric machine is high. The objective of the invention is to reduce or eliminate these disadvantages.

The present invention relates to a rotor module for a rotor of a rotary electric machine with an axis of rotation comprising a stator comprising a stator core including radially oriented stator teeth, the rotor module comprising:
- a rotor module core,
- a plurality of permanent magnets defining a number of magnetic pole pairs comprising a first pole and a second pole, the first pole and the second pole of each magnetic pole pair being adjacent,
- the first poles being North poles and the second poles being South poles or the first poles being South poles and the second poles being North poles,
- the plurality of permanent magnets comprising first magnet arrangements defining each first pole and second magnet arrangements defining each second pole, the first magnet arrangements and the second magnet arrangements being distinct,
- a first angle between the first pole and the second pole of each pairs is equal to 360° divided by two times the number of magnetic pole pairs,
- a second angle between a second pole of a first magnetic pole pair and a first pole of a second magnetic pole pair adjacent to the second pole of the first magnetic pole pair is equal to the sum of the first angle and a first shift angle, the first shift angle being greater than zero and less than or equal to a maximum shift angle, the maximum shift angle being equal to 360° divided by the number of stator teeth. Thanks to a second angle greater than the first angle the torque ripple is reduced. The manufacturing is simplified since one single type of rotor plate is needed to manufacture the rotor module core. Furthermore, the magnet arrangement can be oriented in the direction of the axis of rotation. The assembly of the module core and the magnet arrangements is simplified. The cost of the rotor is reduced.

According to one embodiment, the first shift angle is between 30% and 70% of the first maximum shift angle and preferably between 45% and 55% of the first maximum shift angle.

Thank to such a first shift angle, the torque ripple is reduced while keeping a good mechanical strength of the rotor module core. Moreover, a high torque ripple reduction is reach while limiting the torque reduction.

According to a further development of the present invention, a third angle between a second pole of the second magnetic pole pair and a first pole of a third magnetic pole pair adjacent to the second pole of the second magnetic pole pair is equal to the sum of the first angle and a second shift angle, the second shift angle being greater than zero and less than or equal to a maximum shift angle.

According to a further development of the present invention, the first shift angle and the second shift angle are different.

Thanks to a first shift angle and a second shift angle that are different, several harmonic components of the torque ripple can be effectively reduced.

According to a further development of the present invention, the second shift angle is between 30% and 70% of the maximum shift angle and preferably between 45% and 55% of the maximum shift angle.

According to a further development of the present invention, the second shift angle equals the first shift angle.

The use of a first shift angle and second shift angle that are equal enable a strong reduction of specific harmonic components of the torque ripple.

According to a further development of the present invention, the rotor module comprises at least four magnetic pole pairs, the number of magnetic pole pairs being even, and wherein the first magnetic pole pair and a fourth magnetic pole pair are symmetrical relative to the axis of rotation and the second magnetic pole pair and a fifth magnetic pole pair are symmetrical relative to the axis of rotation.

Such symmetries between the first magnetic pole pair and a fourth magnetic pole pair and, the second magnetic pole pair and a fifth magnetic pole pair improve the balancing of the rotor module.

According to a further development of the present invention, the rotor module core includes a plurality of magnet pockets, the permanent magnets of the first magnet arrangements and the second magnet arrangements being disposed in the magnet pockets.

The magnet arrangement being oriented in the axial direction, the magnet pocket can be straight and in the axial direction. The insertion of the magnet arrangements in the magnet pockets is simplified and the manufacturing cost is reduced.

According to a further development of the present invention, each first magnet arrangement and each second magnet arrangement include two permanent magnets forming a V-shape.

Thanks to such magnet arrangements, more magnet material can be used without the need of increasing the rotor module size. Moreover a higher reluctance torque is reached.

According to a further development of the present invention, each first magnet arrangement and each second magnet arrangement include four permanent magnets forming a double V-shape, the double V-shape comprising a first V-shape and a second V-shape, the tip of the first V-shape and the tip of the second V-shape being aligned on a radial plane of the rotor module, the radial plane defining a direct axis of the pole.

Thanks to such magnet arrangements even more magnet material can be used without the need of increasing the rotor module size. Moreover a higher reluctance torque is reached.

According to a further development of the present invention, each first magnet arrangement and each second magnet arrangement include at least one permanent magnet (18) tangentially embedded in each magnet pocket.

Thanks to such magnet arrangements, the number of permanent magnets can be reduced. The manufacturing of the rotor module is easier.

According to a further development of the invention, the rotor module core is a laminated rotor module core comprising several rotor plates stacked in the direction of the axis of rotation.

The invention also relates to a rotor for rotary electric machine comprising a single rotor module as was described above.

The invention also relates to a rotor for a rotary electric machine comprising at least a first rotor module and a second rotor module, the first rotor module and the second rotor module being rotor modules as was described above wherein the first rotor module and the second rotor module are identical and include a first axial end face and a second axial end face opposite the first axial end face, and wherein the second axial end face of the first rotor module faces the second axial end face of the second rotor module, in particular the second axial end face of the first rotor module is in contact with the second axial end face of the second rotor module.

According to a further development of the present invention, the rotor for rotary electric machine comprises a third rotor module, the third rotor module and the first rotor module being identical, wherein the first axial end face of the third rotor module faces the first axial end face of the second rotor module, in particular the first axial end face of the third rotor module is in contact with the first axial end face of the second rotor module.

Such a rotor comprising a plurality of rotor modules enables a low torque ripple while further limiting the torque reduction. The use of identical rotor modules simplifies the manufacturing of the rotor. The rotor plates of the rotor module cores can be identical reducing the number component references. This simple manufacturing enable the reduction of the cost of the rotor.

The invention also relates to a rotary electric machine comprising a rotor as was described above and a stator comprising a stator core including radially oriented stator teeth.

According to a further development of the present invention, the stator is radially outside the rotor.

The invention will be better understood by reading the following description and examining the figures which accompany it. These figures are provided purely by way of illustration and in no way limit the invention:

The elements which are identical, similar or analogous retain the same reference from one figure to another. The ordinal numbers are used to differentiate features. They do not define a position of a feature. As a consequence, for example, a third feature of a product does not mean that the product has a first and/or a second feature.

Figure 1:
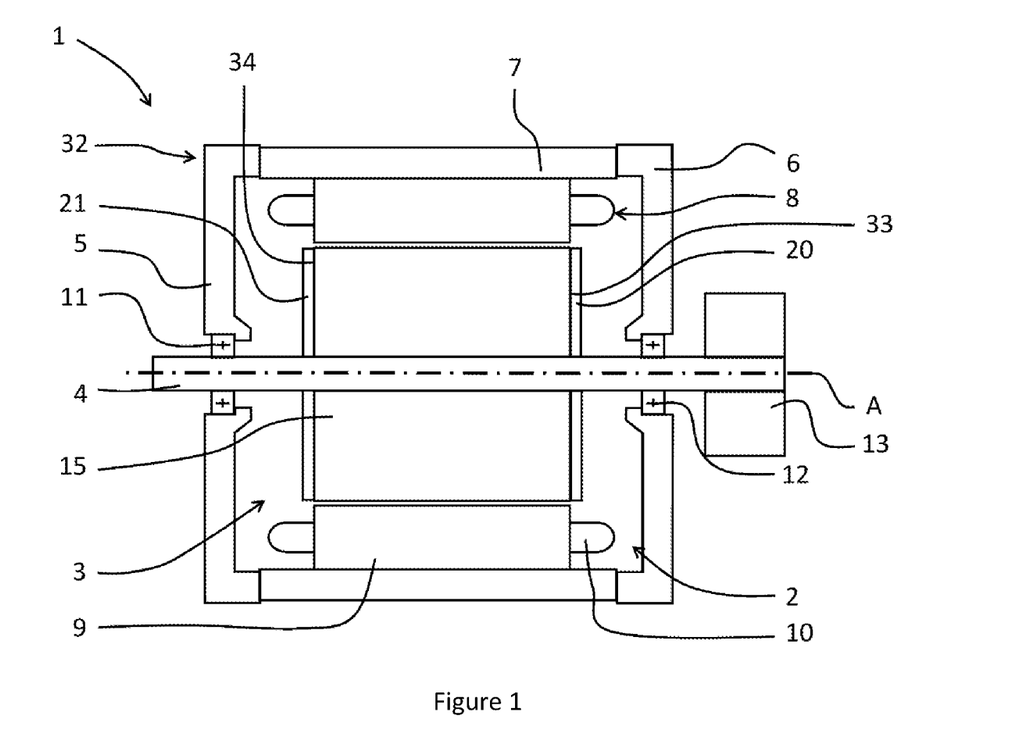
FIG. 1 is a view in transverse cross-section of the rotary electrical machine according to the invention.

FIG. 1 shows a half section through a schematically depicted rotary electrical machine 1. The electrical machine 1 comprises a shaft 4 with a rotor 3 sitting thereon. The shaft 4 is for example mounted by means of a first bearing 11 and second bearing 12 so as to be rotatable about an axis of rotation A relative to a stator 2. The words "axial", "axially" relates to the direction of the axis of rotation A of the rotary electric machine. The stator 2 comprises a stator core 9 and a winding 8. For example, the stator core 9 is a laminated stator core 9 comprising several stator plates. The stator core 9 comprises radially oriented stator teeth. Slots are formed between the teeth. The winding 8 comprises conductors. The conductors are arranged in the slots. Winding ends 10 are electrically connecting the conductors to form the winding 8. For instance, the winding 8 is a U-Pin type winding or a multi-lobed winding. For example, the winding is three-phase alternating current winding or a double three-phase alternating current winding.

For example, the first bearing 11 sits in a first bracket 5, and the second bearing 12 sits in a second bracket 6. The first bearing 11 and the second bearing 12 are for instance ball bearings, roller bearings or plain bearings. In the embodiment of FIG. 1, the rotary electric machine includes a housing 32. The housing 32 comprises the first bracket 5, the second bracket 6 and a housing part 7. The housing part 7 connects the first bracket 5 and the second bracket 6. For example, the stator core 9 is press fitted in the housing part 7 in particular, the housing part 7 comprises a cylindrical inner surface in which an outer cylindrical surface of the stator core 9 in press fitted. In another embodiment not shown, the first bracket or the second bracket comprises a first tubular portion in which the stator core is press fitted. The other bracket can comprise a second tubular portion. A cooling chamber can be formed between the first tubular portion and the second tubular portion. In another embodiment not shown, a cooling chamber is formed in the housing part.

The shaft 4 can be rotationally linked to a driving member 13 such as a pulley or a gear wheel.

The rotor 3 is rotationally connected to the shaft. The rotor can comprise a first end ring 21 and a second end ring 20 located at the axially opposed ends of the rotor. The first end ring 21 and the second end ring 20 are for example balancing ring. For example, the balancing of the rotor is achieved by material removal in the first and/or the second balancing ring.

The rotor 3 comprises one or a plurality of rotor modules 15.

Figure 2:
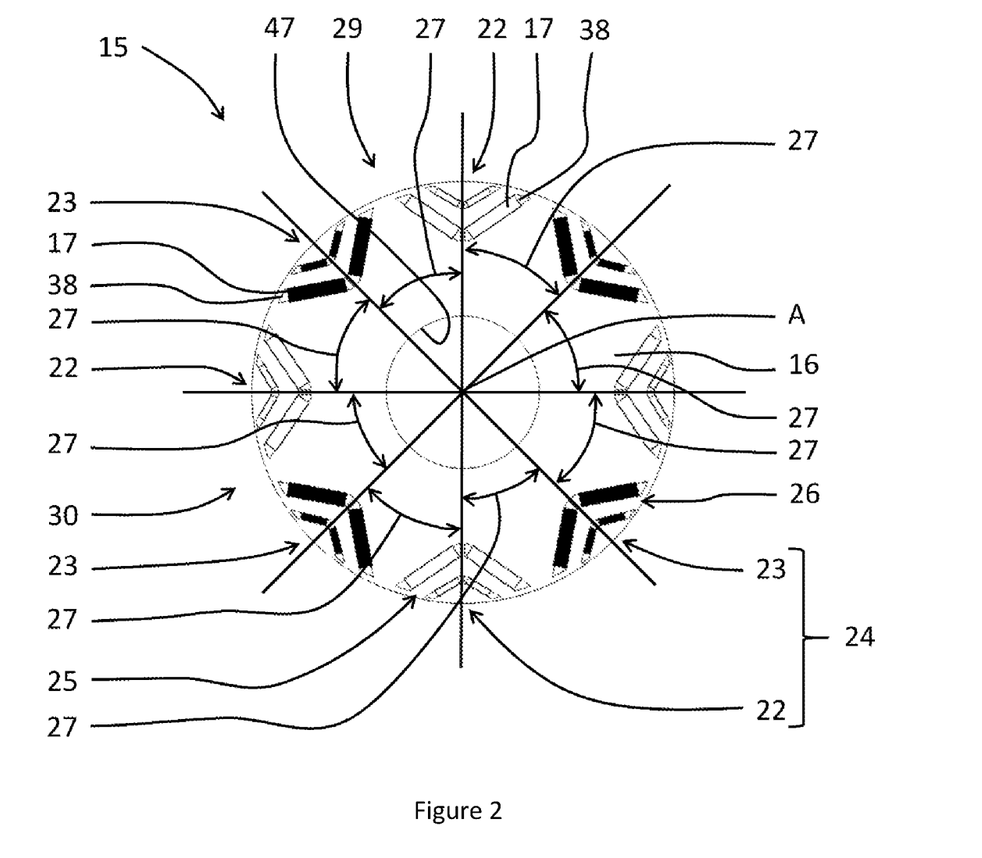
FIG. 2 shows a rotor module according to prior art.

FIG. 2 shows a rotor module 15 of the prior art in a view perpendicular to the axis of rotation A. The rotor modules 15 comprises a rotor module core 16. The rotor module core 16 is for example a laminated rotor module core comprising several rotor plates stacked in the direction of the axis of rotation A. The rotor module core 16 comprises a plurality of magnet pockets 38. A plurality of permanent magnets 17 are disposed in the magnet pocket 38. The plurality of permanent magnet 17 defines a number of magnetic pole pairs 24 comprising a first pole 22 and a second pole 23, the first pole 22 and the second pole 23 of each magnetic pole pair being adjacent. The first poles 22 being North poles and the second poles 23 being South poles or the first poles 22 being South poles and the second poles 23 being North poles. The rotor module of FIG. 2 includes four magnetic pole pairs 24.

The plurality of permanent magnets 17 defines first magnet arrangements 25 defining each first pole 22 and second magnet arrangements 26 defining each second pole 23. The first magnet arrangements 25 and the second magnet arrangements 26 are distinct. In other words, no magnet is shared between first magnet arrangements 25 and second magnet arrangement 26.

A first angle 27 between the first pole 22 and the second pole 23 of each pairs is equal to 360° divided by two times the number of magnetic pole pairs 24. The angles between the first pole and the second pole of adjacent magnetic pole pairs 24 are equal to the first angle. Each first pole 22 and each second pole 23 has a direct axis. The angles between the poles are measured between the direct axes of the poles.

Each first magnet arrangement 25 and each second magnet arrangement 26 include four permanent magnets 17 forming a double V-shape, the double V-shape comprising a first V-shape 39 and a second V-shape 40. The tip of the first V-shape 39 and the tip of the second V-shape 40 are aligned on a radial plane of the rotor module, the radial plane defining a direct axis of the pole.

Figure 3:
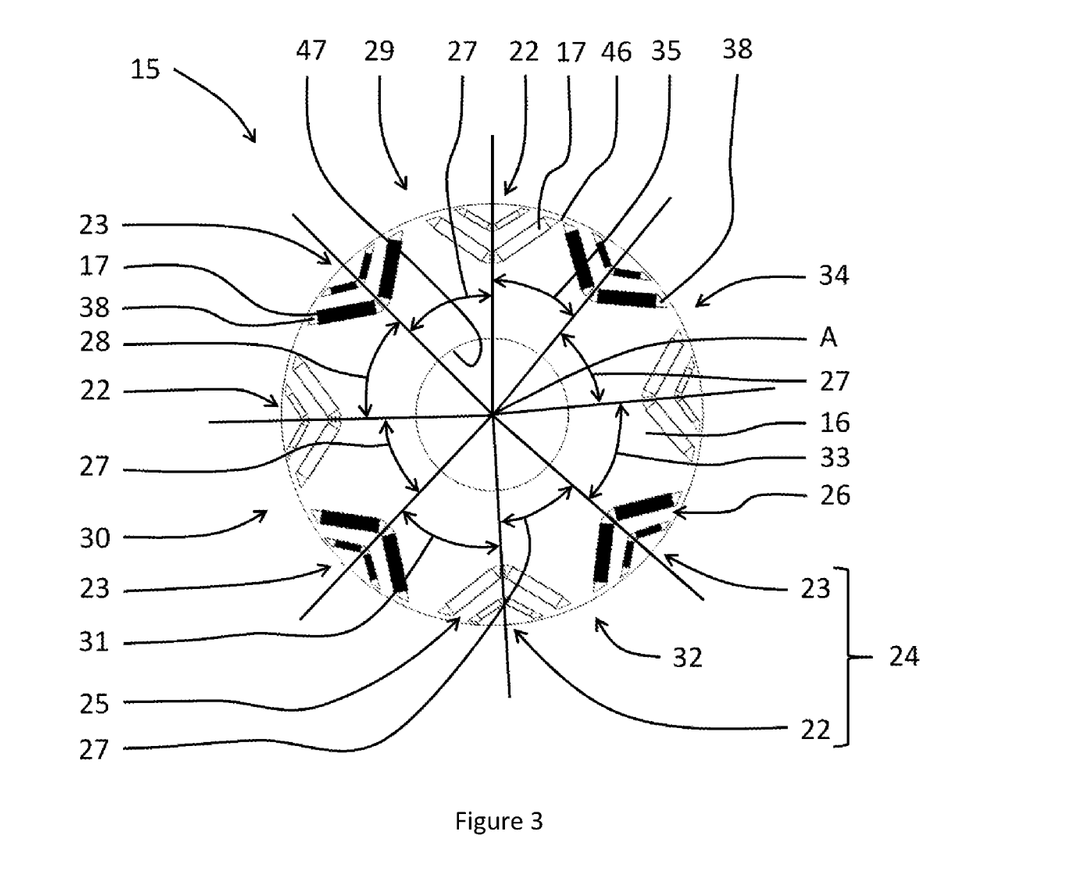
FIG. 3 shows a rotor module according to a first embodiment of the invention.

FIG. 3 shows a rotor module 15 according to a first embodiment of the invention. This rotor module 15 shares some features with the prior art rotor module described before. Only differences will be described in detail.

A second angle 28 between a second pole 23 of a first magnetic pole pair 29 and a first pole 22 of a second magnetic pole pair 30 adjacent to the second pole 23 of the first magnetic pole pair 29 is equal to the sum of the first angle 27 and a first shift angle. The first shift angle is greater than zero and less than or equal to a maximum shift angle. The maximum shift angle is equal to 360° divided by the number of stator teeth. Thus, the second angle 28 is larger than the first angle 27. The first shift angle can be between 30% and 70% of the first maximum shift angle and preferably between 45% and 55% of the first maximum shift angle.

Moreover, for example, a third angle 31 between a second pole 23 of the second magnetic pole pair 30 and a first pole 22 of a third magnetic pole pair 32 adjacent to the second pole 23 of the second magnetic pole pair 30 is equal to the sum of the first angle 27 and a second shift angle. The second shift angle is greater than zero and less than or equal to a maximum shift angle.

The second shift angle can be between 30% and 70% of the maximum shift angle and preferably between 45% and 55% of the maximum shift angle.

In the first embodiment of the invention shown on FIG. 3, the second shift angle equals the first shift angle.

In a variant of the first embodiment not shown, the second shift angle is different from the first shift angle.

Moreover, for example, a fourth angle 33 between a second pole 23 of the third magnetic pole pair 32 and a first pole 22 of a sixth magnetic pole pair 34 adjacent to the second pole 23 of the third magnetic pole pair 32 is equal to the sum of the first angle 27 and a third shift angle. The third shift angle is greater than zero and less than or equal to a maximum shift angle.

The third shift angle can be between 30% and 70% of the maximum shift angle and preferably between 45% and 55% of the maximum shift angle.

In the first embodiment of the invention shown on FIG. 3, the third shift angle equals the first shift angle.

In another embodiment not shown, the second shift angle is different from the first shift angle and/or the second shift angle.

Figure 8:
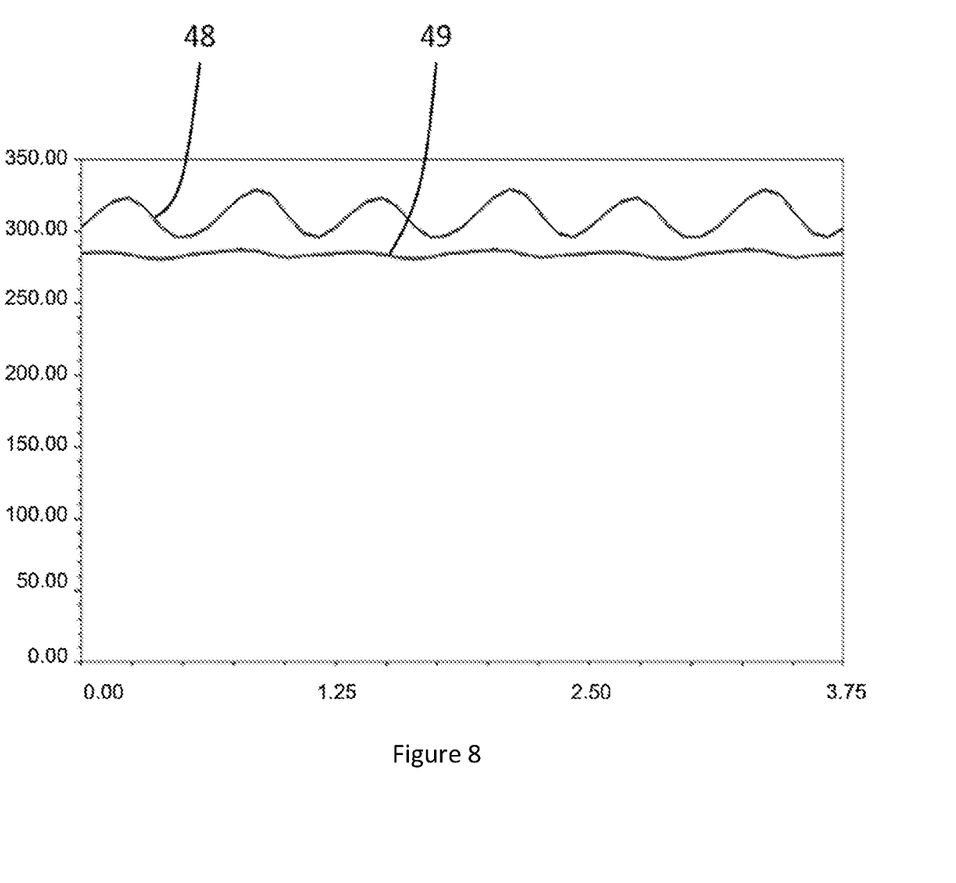
FIG. 8 shows a graph of the torque with a rotor module according to prior art and the torque with a rotor module according to the first embodiment of the invention.

The FIG. 8 shows a comparison of a first output torque 48 of a rotary electric machine fitted with a rotor module of prior art shown in FIG. 2 and a second output torque 49 of a rotary electric machine fitted with the rotor module shown in FIG. 3. The torque ripple of second output torque 49 is reduced five times compared with the torque ripple of the first output torque 48.

The size and shape of the magnet pockets 38 are defined so that the magnets 17 can be inserted in the magnet pockets 38. The magnet pockets 38 can includes free spaces, that is to say, spaces which are not filled by the magnets 17. The free spaces can improve the magnetic fluxes in the rotor. The free spaces can be filled with a resin to hold the magnet.

In the first embodiment of the invention shown on FIG. 3, the rotor module 15 comprises four magnetic pole pairs 24, the first magnetic pole pair 29, the second magnetic pole pair 30, the third magnetic pole pair 32 and the sixth magnetic pole pair 34. A fifth angle 35 is defined between the second pole 23 of the sixth magnetic pole pair 34 and the first pole 22 of the first magnetic pole pair 29. Given the first shift angle, the second shift angle and the third shift angle, the fifth angle is smaller than the first angle 27. Of course the different shift angles must be defined so that the fifth angle is large enough to keep a bridge 46 in the rotor module core between the magnet pockets of the second pole 23 of the sixth magnetic pole pair 34 and the first pole 22 of the first magnetic pole pair 29. For example, the bridge must be thick enough to withstand well-known mechanical stresses such as the stresses due to centrifugation. For manufacturability reasons, the bridge can be thicker than a thickness of one rotor plate.

In variant of the first embodiment not shown, the number of magnetic pole pairs is different, for example 5 or more magnetic pole pairs. A last magnetic pole pair is adjacent to first magnetic pole pair 29 opposite the second magnetic pole pair 30. A last angle is defined between the second pole of the last magnetic pole pair and the first pole of the first magnetic pole pair. The different shift angles must be defined so that the last angle is large enough to keep a bridge 46 in the rotor module core between the magnet pockets of the second pole 23 of the last magnetic pole pair and the first pole 22 of the first magnetic pole pair 29. For example, the bridge must be thick enough to withstand well-known mechanical stresses such as the stresses due to centrifugation. For manufacturability reasons, the bridge can be thicker than a thickness of one rotor plate.

Figure 4:
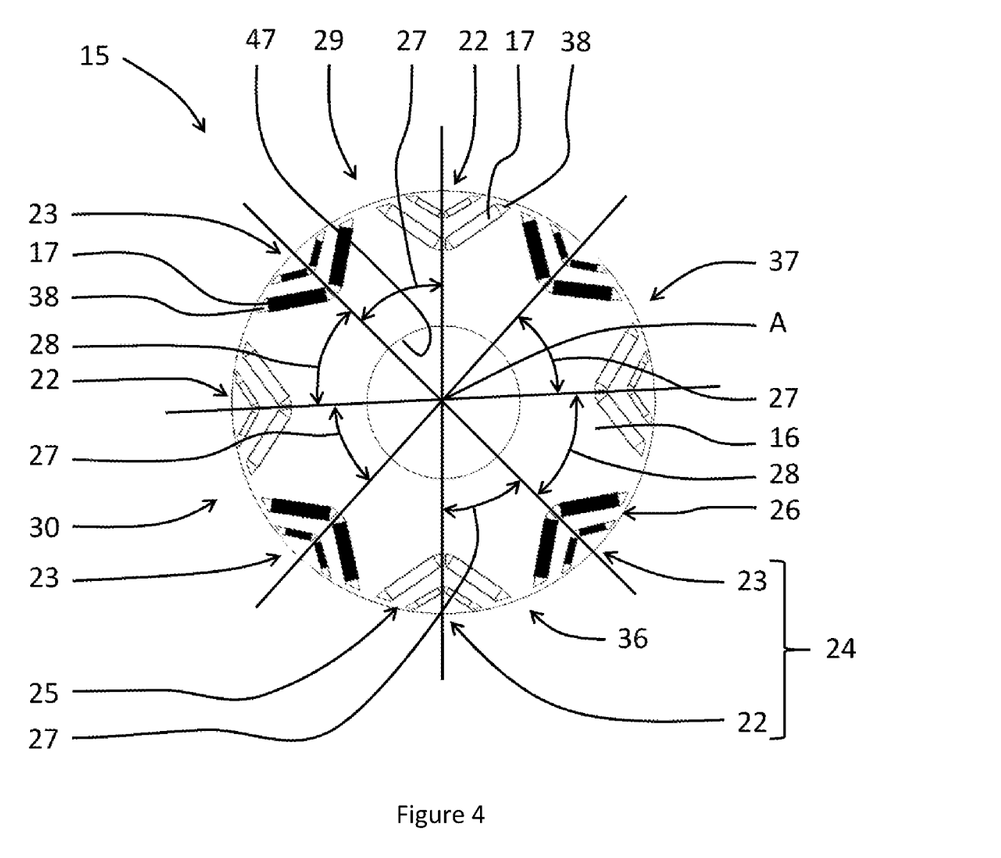
FIG. 4 shows a rotor module according to a second embodiment of the invention.

FIG. 4 shows a rotor module 15 according to a second embodiment of the invention. This rotor module 15 shares some features with the prior art rotor module described before. Only differences will be described in detail.

The rotor module 15 comprises four magnetic pole pairs.

As in the first embodiment, a second angle 28 between a second pole 23 of a first magnetic pole pair 29 and a first pole 22 of a second magnetic pole pair 30 adjacent to the second pole 23 of the first magnetic pole pair 29 is equal to the sum of the first angle 27 and a first shift angle. The first shift angle is greater than zero and less than or equal to a maximum shift angle. The maximum shift angle is equal to 360° divided by the number of stator teeth. Thus, the second angle 28 is larger than the first angle 27.

The rotor module 15 comprises a fourth magnetic pole pair 36 and a fifth magnetic pole pair 37. The first magnetic pole pair 29 and a fourth magnetic pole pair 36 are symmetrical relative to the axis of rotation A. The second magnetic pole pair 30 and a fifth magnetic pole pair 37 are symmetrical relative to the axis of rotation A. The angle between a second pole 23 of the fourth magnetic pole pair 36 and the first pole 22 of the fifth magnetic pole pair 37 is equal to the second angle 28.

In a variant of the second embodiment of the invention not shown the number of magnetic pole pairs is even and greater or equal to six. Each magnetic pole pair is symmetrical with another magnetic pole pair relative to the axis of rotation A.

As in the first embodiment of the invention and its variants, the different shift angles must be defined to keep a bridge 46 in the rotor module core between the magnet pockets of the first pole and the second pole of adjacent magnetic pole pairs. For example, the bridge must be thick enough to withstand well-known mechanical stresses such as the stresses due to centrifugation. For manufacturability reasons, the bridge can be thicker than a thickness of one rotor plate.

As can be seen in FIG. 3 and FIG. 4, the rotor module core 16 includes a plurality of magnet pockets 38. The permanent magnets 17, 18 of the first magnet arrangements 25 and the second magnet arrangements 26 can be disposed in the magnet pockets 38. Each first magnet arrangement 25 and each second magnet arrangement 26 includes four permanent magnets 17 forming a double V-shape, the double V-shape comprising a first V-shape 39 and a second V-shape 40. For example, the tip of the first V-shape 39 and the tip of the second V-shape 40 are aligned on a radial plane of the rotor module. For example, the radial plane defines a direct axis of the pole.

In another embodiment not shown, each first magnet arrangement 25 and each second magnet arrangement 26 includes two permanent magnets 17 forming a V-shape.

Figure 5:
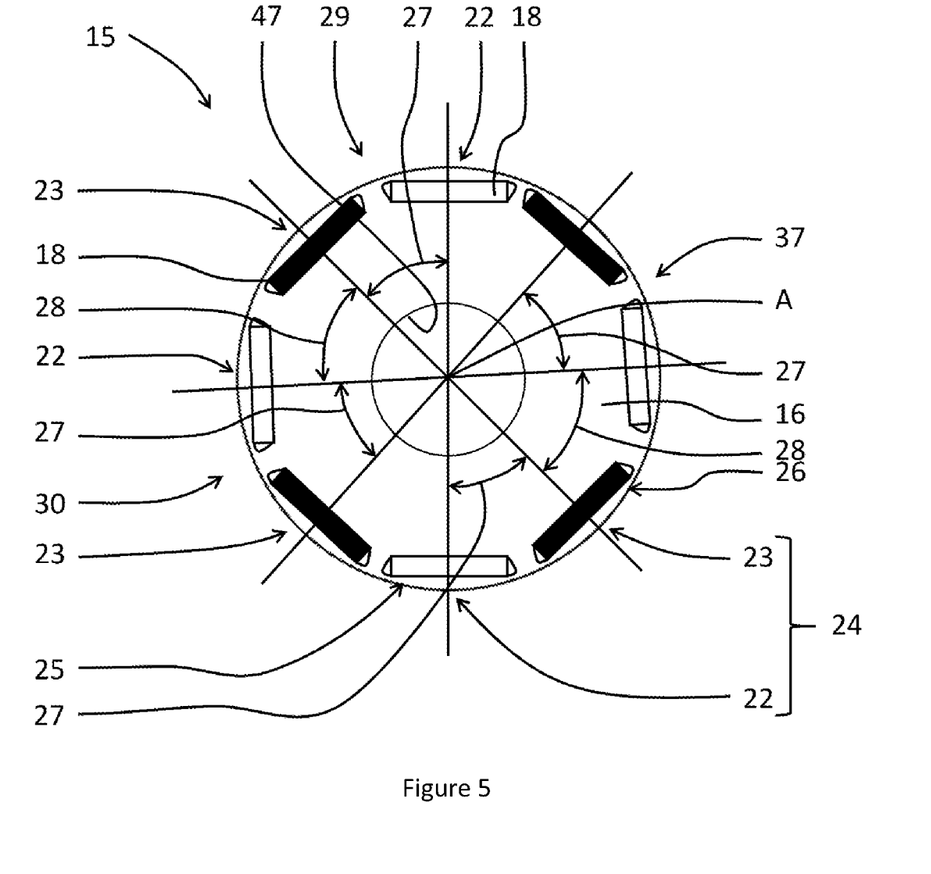
FIG. 5 shows a rotor module according to a third embodiment of the invention provided with magnets oriented ortho-radially.

FIG. 5 shows a third embodiment of the invention. The third embodiment is similar to the second embodiment. However, each first magnet arrangement 25 and each second magnet arrangement 26 include at least one permanent magnet 18 tangentially embedded in each magnet pocket 38. In other words, the magnet are oriented orthoradially.

Another embodiment of the invention not shown is similar to the first embodiment of the invention but the first and second magnet arrangements are similar to the first and second magnet arrangements of the third embodiment of the invention. Another embodiment of the invention not shown is similar to the variant of the first embodiment of the invention but the first and second magnet arrangements are similar to the first and second magnet arrangements of the third embodiment of the invention.

Another embodiment of the invention not shown is similar to the variant of the second embodiment of the invention but the first and second magnet arrangements are similar to the first and second magnet arrangements of the third embodiment of the invention.

In all embodiments, the permanent magnets can include a plurality of elementary permanent magnets.

For example, the rotor 3 of the rotary electric machine 1 comprises one single rotor module 15.

Figure 6:
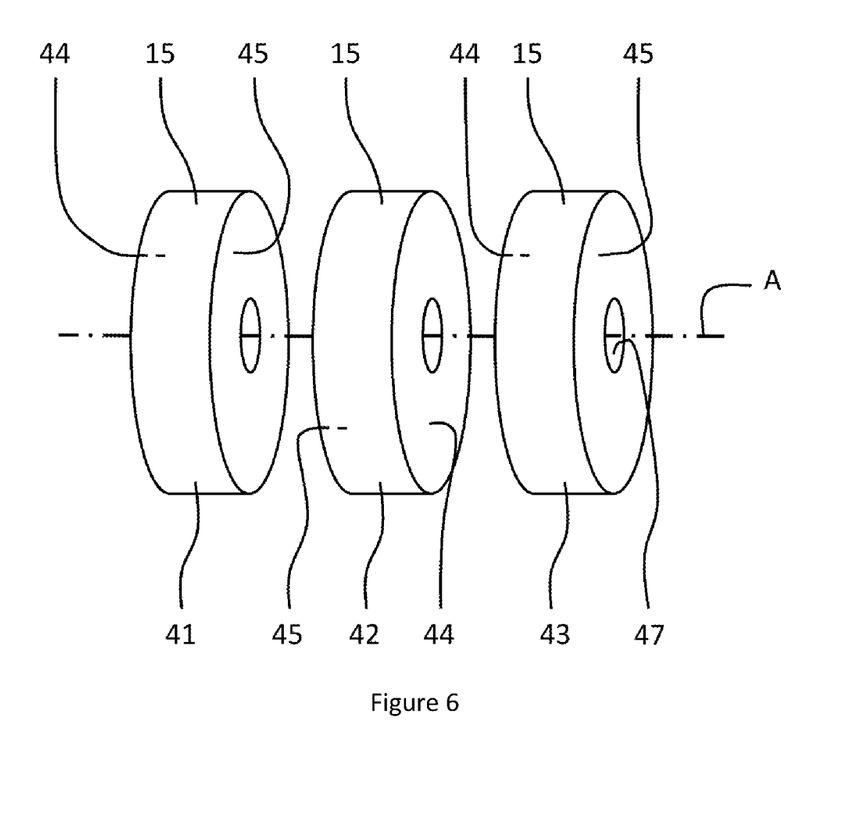
FIG. 6 shows a partial exploded schematic view of a rotor according to an embodiment of the invention.
Figure 7:
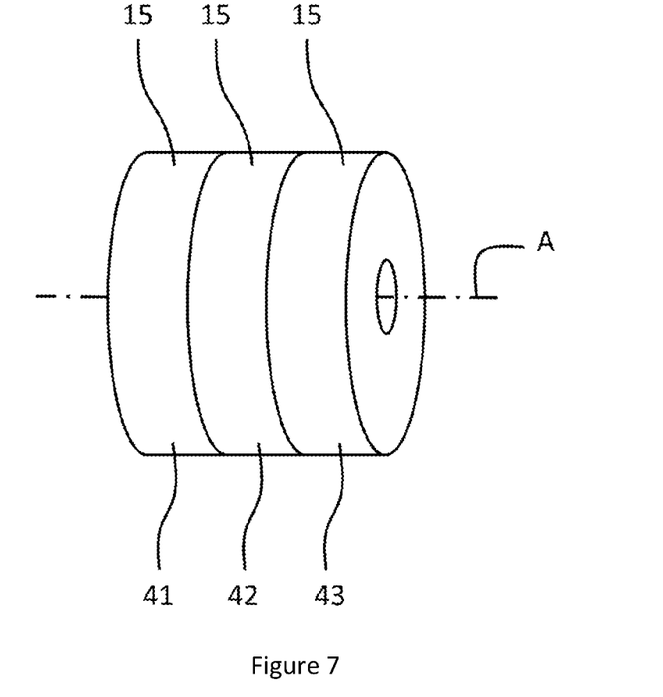
FIG. 7 shows a partial schematic view of the rotor of FIG. 6.

In another embodiment, the rotor 3 of the rotary electric machine 1 comprises at least a first rotor module 41 and a second rotor module 42. The first rotor module 41 and the second rotor module 42 are identical. The first rotor module 41 and the second rotor module 42 include a first axial end face 44 and a second axial end face 45 opposite the first axial end face 44. The second axial end face 45 of the first rotor module 41 faces the second axial end face 45 of the second rotor module 42, in particular the second axial end face 45 of the first rotor module 41 is in contact with the second axial end face 45 of the second rotor module 42. Thanks the shift angles described earlier, the first axial end face 44 and the second axial end face 45 are different.

In another embodiment, in addition to the first rotor module 41 and the second rotor module 42, the rotor 3 for rotary electric machine 1 comprises a third rotor module 43. The third rotor module 43 and the first rotor module 41 are identical. For example the first axial end face 44 of the third rotor module 43 faces the first axial end face 44 of the second rotor module 43, in particular the first axial end face 44 of the third rotor module 43 is in contact with the first axial end face 44 of the second rotor module 43.

In another embodiment, the rotor comprises more than tree rotor modules 15. In another embodiment, some first axial end faces of adjacent rotor modules are facing each other and/or some second axial end faces of adjacent rotor modules face each other and at least one first axial end face faces a second axial face of an adjacent rotor module.

FIG. 6 shows a schematic exploded view of such a rotor 3 comprising a first rotor module 41, a second rotor module 42 and a third rotor module 43. The FIG. 7 is another view of rotor 3.

The figures show embodiments of rotor modules 15, rotor 3 for rotary electric machines 1 wherein the stator 2 is radially outside the rotor 3. As can be seen in the figures, the rotor modules 15 and rotor comprise an axial hole 47. The axial hole 47 is designed to accommodate the shaft 13. The rotor 3 is for example press fitted on the shaft 13. In another example, the shaft 13 includes a shoulder and a thread. The rotor 3 is for example secured to the shaft 13 between the shoulder and a nut screwed on the tread.

In another embodiment not shown, the rotor is not sitting on a shaft. The rotor is for example mounted on a tubular part such as a clutch carrier of a clutch module.

In another embodiment not shown, the rotor is secured to a rotor hub.

In another embodiment not shown the stator is radially inside the rotor.

LIST OF REFERENCE NUMBERS 1 rotary electric machine
2 stator
3 rotor
4 shaft
5 first bracket 6 second bracket
7 housing part
8 winding
9 stator core
10 winding end
11 first bearing
12 second bearing
13 driving member
15 rotor module
16 rotor module core
17 permanent magnet
18 permanent magnet
20 second end ring
21 first end ring
22 first pole
23 second pole
24 magnetic pole pair
25 first magnet arrangement
26 second magnet arrangement
27 first angle
28 second angle
29 first magnetic pole pair
30 second magnetic pole pair
31 third angle
32 third magnetic pole pair
33 fourth angle
34 sixth magnetic pole pair
35 fifth angle
36 fourth magnetic pole pair
37 fifth magnetic pole pair
38 magnet pocket
39 first V-shape
40 second V-shape
41 first rotor module
42 second rotor module
43 third rotor module
44 first axial end face
45 second axial end face
46 bridge
47 axial hole
48 first output torque
49 second output torque

The invention claimed is:

1. A rotor module for a rotor of a rotary electric machine with an axis of rotation comprising a stator comprising a stator core including radially oriented stator teeth, the rotor module comprising:
a rotor module core; and
a plurality of permanent magnets defining a number of magnetic pole pairs comprising a first pole and a second pole, the first pole and the second pole of each magnetic pole pair being adjacent,
the first poles being North poles and the second poles being South poles, or the first poles being South poles and the second poles being North poles,
the plurality of permanent magnets defining first magnet arrangements defining each first pole and second magnet arrangements defining each second pole,
the first magnet arrangements and the second magnet arrangements being distinct,
a first angle between the first pole and the second pole of each pairs is equal to 360° divided by two times the number of magnetic pole pairs, and
a second angle between a second pole of a first magnetic pole pair and a first pole of a second magnetic pole pair adjacent to the second pole of the first magnetic pole pair is equal to the sum of the first angle and a first shift angle, the first shift angle being greater than zero and less than or equal to a maximum shift angle, the maximum shift angle being equal to 360° divided by the number of stator teeth.

2. The rotor module according to claim 1, wherein the first shift angle is between 45% and 55% of the first maximum shift angle.

3. The rotor module according to claim 1, wherein a third angle between a second pole of the second magnetic pole pair and a first pole of a third magnetic pole pair adjacent to the second pole of the second magnetic pole pair is equal to the sum of the first angle and a second shift angle, the second shift angle being greater than zero and less than or equal to a maximum shift angle.

4. The rotor module according to claim 3, wherein the second shift angle is between 45% and 55% of the maximum shift angle.

5. The rotor module according to claim 4, wherein the second shift angle equals the first shift angle.

6. The rotor module according to claim 1, further comprising: at least four magnetic pole pairs, and wherein the first magnetic pole pair and a fourth magnetic pole pair are symmetrical relative to the axis of rotation and the second magnetic pole pair and a fifth magnetic pole pair are symmetrical relative to the axis of rotation.

7. The rotor module according to claim 1 wherein the rotor module core includes a plurality of magnet pockets, the permanent magnets of the first magnet arrangements and the second magnet arrangements being disposed in the magnet pockets.

8. The rotor module according to claim 7, wherein each first magnet arrangement and each second magnet arrangement includes two permanent magnets forming a V-shape.

9. The rotor module according to claim 7, wherein each first magnet arrangement and each second magnet arrangement includes four permanent magnets forming a double V-shape, the double V-shape comprising a first V-shape and a second V-shape, a tip of the first V-shape and a tip of the second V-shape being aligned on a radial plane of the rotor module, the radial plane defining a direct axis of the pole.

10. The rotor module according to claim 7, wherein each first magnet arrangement and each second magnet arrangement includes at least one permanent magnet tangentially embedded in each magnet pocket.

11. A rotary electric machine comprising a rotor according to claim 10; and a stator comprising a stator core including radially oriented stator teeth.

12. The rotary electric machine according to claim 11, wherein the stator is radially outside the rotor.

13. A rotor for a rotary electric machine comprising a single rotor module according to claim 1.

14. A rotor for a rotary electric machine comprising:
at least a first rotor module and a second rotor module, the first rotor module and the second rotor module being rotor modules according to claim 1,
wherein the first rotor module and the second rotor module are identical and include a first axial end face and a second axial end face opposite the first axial end face, and
wherein the second axial end face of the first rotor module faces the second axial end face of the second rotor module, the second axial end face of the first rotor module being in contact with the second axial end face of the second rotor module.

15. The rotor for rotary electric machine according to claim 14, further comprising a third rotor module, the third rotor module and the first rotor module being identical, wherein the first axial end face of the third rotor module faces the first axial end face of the second rotor module, wherein the first axial end face of the third rotor module is in contact with the first axial end face of the second rotor module.

\* \* \* \* \*